(12) United States Patent
Alshawabkeh et al.

(10) Patent No.: US 12,056,385 B2
(45) Date of Patent: Aug. 6, 2024

(54) STORAGE MEDIA SCRUBBER

(71) Applicant: EMC IP Holding Company LLC, Hopkinton, MA (US)

(72) Inventors: Malak Alshawabkeh, Franklin, MA (US); Seema Pai, Shrewsbury, MA (US); Dale Elliott, Northborough, MA (US); Christopher Monti, Tyngsboro, MA (US); Sunil Gumaste, Jalahalli (IN); Krishnamoorthy Anantharaman, Bangalore (IN); Ravish Sachdeva, Jammu (IN); Abhilash Sanap, Maharashtra (IN); Pankaj Soni, Sikar (IN); ShashiKiran Talanki Ramanathagupta, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/389,499

(22) Filed: Jul. 30, 2021

(65) Prior Publication Data
US 2023/0031331 A1 Feb. 2, 2023

(51) Int. Cl.
*G06F 12/00* (2006.01)
*G06F 3/06* (2006.01)

(52) U.S. Cl.
CPC .......... *G06F 3/0652* (2013.01); *G06F 3/0619* (2013.01); *G06F 3/0653* (2013.01); *G06F 3/0683* (2013.01)

(58) Field of Classification Search
CPC ..... G06F 3/0619; G06F 3/0653; G06F 3/0683

USPC .......................................................... 711/166
See application file for complete search history.

(56) References Cited

U.S. PATENT DOCUMENTS

| | | | | |
|---|---|---|---|---|
| 5,632,012 A | * | 5/1997 | Belsan | G11B 20/1833 |
| 7,640,231 B2 | * | 12/2009 | Alvarez | G06F 9/50 |
| 8,760,780 B1 | * | 6/2014 | Brooker | G11B 20/1816 |
| | | | | 714/794 |
| 9,244,792 B1 | * | 1/2016 | Fischer | G06F 11/1088 |
| 9,665,630 B1 | * | 5/2017 | Bigman | G06F 3/061 |
| 10,353,610 B1 | * | 7/2019 | Khokhar | G06F 3/0605 |
| 10,922,012 B1 | * | 2/2021 | Ummadi | G06F 11/106 |
| 11,449,443 B2 | * | 9/2022 | Kragel | G06F 13/4282 |
| 2016/0239361 A1 | * | 8/2016 | Vlassarev | G06F 11/0766 |
| 2017/0147425 A1 | * | 5/2017 | Waheed | G06F 11/2094 |
| 2019/0121687 A1 | * | 4/2019 | Masuda | G06F 11/3447 |
| 2020/0225857 A1 | * | 7/2020 | Tarango | G06N 5/04 |
| 2020/0285737 A1 | * | 9/2020 | Kraus | G06F 21/552 |
| 2020/0322366 A1 | * | 10/2020 | Yan | H04L 63/1425 |
| 2021/0406148 A1 | * | 12/2021 | Bertran | G06F 11/079 |
| 2022/0342556 A1 | * | 10/2022 | Dimnaku | G06F 3/067 |
| 2023/0033647 A1 | * | 2/2023 | Lemberg | H04L 41/065 |

\* cited by examiner

*Primary Examiner* — Mohamed M Gebril
(74) *Attorney, Agent, or Firm* — Krishnendu Gupta; Nikhil Patel (57) ABSTRACT

Aspects of the present disclosure relate to detecting and correcting a storage array's drive sectors to prevent data loss. In embodiments, a storage array's telemetry information is monitored. Further, one or more state or operational metrics of the storage array's storage drives are measured. Additionally, each storage drive is scrubbed based on each drive's relative scrubbing priority defined by the telemetry information and each storage drive's state or operation metrics.

20 Claims, 5 Drawing Sheets

STORAGE MEDIA SCRUBBER

BACKGROUND

A storage array is a data storage system for block-based storage, file-based storage, or object storage. Rather than store data on a server, storage arrays use multiple drives in a collection capable of storing a vast amount of data. Although an array's drives are reliable, they can experience undetectable errors (e.g., undetected disk errors (UDEs) or latent sector errors (LSEs)). These errors can cause data corruption and data loss events. Therefore, a storage array can include a disk scrubber that scans the array's drives to detect and mitigate the errors and their related data corruption and data loss events.

SUMMARY

Aspects of the present disclosure relate to detecting and correcting a storage array's drive sectors to prevent data loss. In embodiments, a storage array's telemetry information is monitored. Further, one or more state or operational metrics of the storage array's storage drives are measured. Additionally, each storage drive is scrubbed based on each drive's relative scrubbing priority defined by the telemetry information and each storage drive's state or operation metrics.

In embodiments, one or more input/output (IO) workloads received by the storage array can be monitored. Additionally, one or more characteristics of each workload's IO operations can be identified. Further, prior written data can be read from each storage drive's storage media to detect any errors during a read operation.

In embodiments, the one or more characteristics can include at least one or more of an IO size, IO type, IO service level, destination target device, data types related to each IO operation, address spaces, IO densities, and response time requirements.

In embodiments, the state or operational metrics can correspond to one or more of each storage drive's capacity, performance capabilities, idle or operating temperatures, powered on/off conditions, errors, and IO characteristics of IO operations associated with each storage drive, amongst other storage drive metrics.

In embodiments, each storage drive's performance can be determined. For example, each storage drive's performance can be defined by their respective state, operational metrics, received IO sizes, amount and frequency of received 10 data read/write requests, and response times, amongst other related performance parameters.

In embodiments, one or more data collection time intervals can be established to collect and analyze the telemetry, state, and operational information/metrics.

Each data collection time interval can be based on patterns identified from historical or current IO workloads received by the storage array in embodiments.

Each storage drive's relative scrubbing priority can be determined within each data collection time interval in embodiments.

In embodiments, each drive's relative scrubbing priority can be determined from each storage drive's respective local outlier factor (LOF). Each storage drive's LOF can be defined by the drive's relative state or operational metrics.

In embodiments, each drive's state or operational metrics can be aggregated. Additionally, one or more outlier models can be generated from the aggregated state or operational metrics using one or more machine learning (ML) techniques. Further, each storage drive can be assigned with a relative scrubbing priority using one or more outlier models.

DETAILED DESCRIPTION

A storage array is a data storage system that includes multiple storage drives (e.g., hard disk drives (HDDs) or solid-state drives (SSDs)). Storage array system allows the separation of data storage from computing devices. The break of data storage from computing devices enables multiple users to collaborate and share information in a scalable manner. This type of sharing is especially important for organizations with employees that need to collaborate to perform their duties.

In some circumstances, a storage system's disks can encounter data loss due to disk failures. For example, a latent sector error (LSE)) are errors that the array does not detect when they occur. An LSE can cause data loss because the storage array often discovers an LSE for the first time after it directs a write request to a drive's address space or track associated with the LSE. Currently, organizations use naïve disk scrubbing techniques to detect and correct sector errors to prevent such occurrences of data loss. However, these techniques include scrubbing entire populations (e.g., pools) of drives which degrade the storage system's performance.

Embodiments of the present disclosure include techniques to prioritize each storage disk's relative scrubbing priority. For example, the methods involve performing real-time machine learning (ML) disk evaluation to identify disk activity outlier patterns. Based on the outlier patterns, the embodiments can establish probabilities related to the existence of an LSE on one or more sectors of the array's disk drives. Accordingly, the embodiments of the present disclosure can control an allocation of the array's computing resources (e.g., memory or processing resources) to disk scrubbing operations based on, e.g., input/output (IO) operations per second (IOPS) of each IO workload the array receives.

Figure 1:
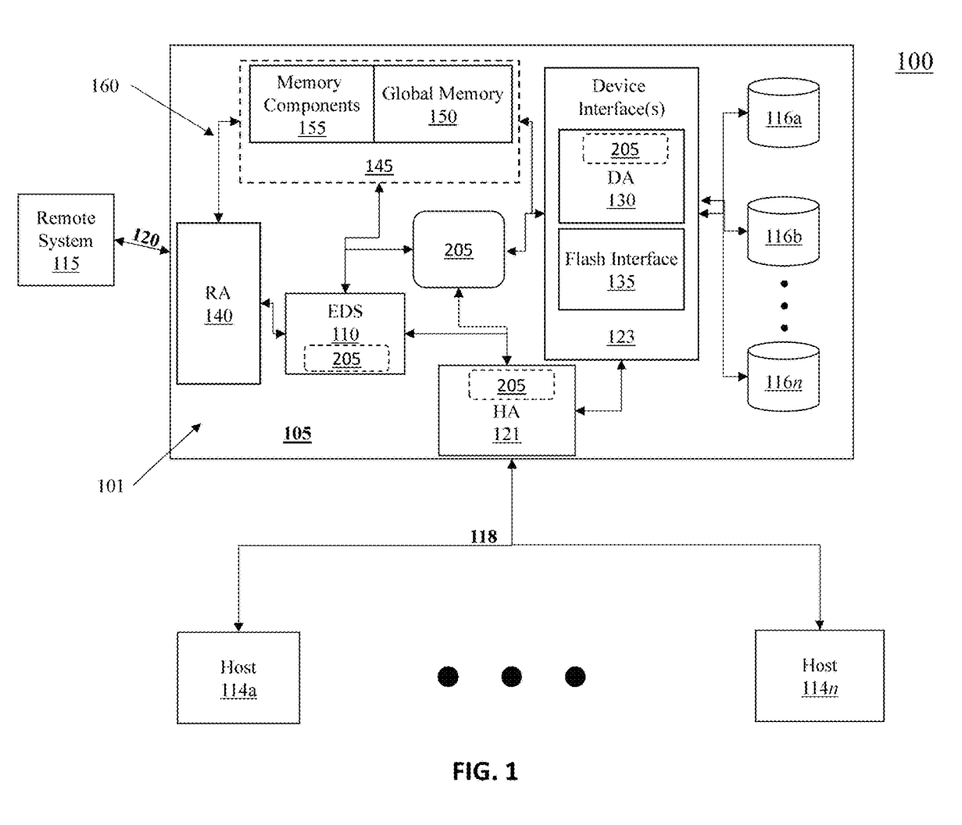
FIG. 1 is a block diagram of a storage array in accordance with embodiments of the present disclosure.

Regarding FIG. 1, a system 100 includes a storage array 105 that includes components 101 configured to perform one or more distributed file storage services. In embodiments, the array 105 can include one or more internal communication channels 160 that communicatively couple each of the array's components 101. The communication channels 160 can include Fibre channels, internal busses, or communication modules. For example, the array's global memory 150 can use the communication channels 160 to transfer data or send other communications between the array's components 101.

In embodiments, the array 105 and one or more devices can form a network. For example, a first communication network 118 can communicatively couple the array 105 to one or more host systems 114a-n. Likewise, a second communication network 120 can communicatively couple the array 105 to a remote system 115. Thus, the first and second networks 118, 120 can interconnect devices to form a network (networked devices). The network can be a wide area network (WAN) (e.g., Internet), local area network (LAN), intranet, Storage Area Network (SAN)), and the like.

In further embodiments, the array 105 and other networked devices (e.g., the hosts 114a-n and the remote system 115) can send/receive information (e.g., data) using a communications protocol. The communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

The array 105, remote system 116, hosts 115a-n, and the like can connect to the first or second networks 118,120 via a wired/wireless network connection interface, bus, data link, and the like. Further, the first and second networks 118, 120 can also include communication nodes that enable the networked devices to establish communication sessions. For example, communication nodes can include switching equipment, phone lines, repeaters, multiplexers, satellites, and the like.

In embodiments, one or more of the array's components 101 can process input/output (IO) workloads. An IO workload can include one or more IO requests (e.g., operations) originating from one or more of the hosts 114a-n. The hosts 114a-n and the array 105 can be physically co-located or located remotely from one another. In embodiments, an IO request can include a read/write request. For example, an application executing on one of the hosts 114a-n can perform a read or write operation resulting in one or more data requests to the array 105. The IO workload can correspond to IO requests received by the array 105 over a time interval.

In embodiments, the array 105 and remote system 115 can include any single or multi-processor systems (e.g., an Intel-based processor and the like). Likewise, the array's components 101 (e.g., HA 121, RA 140, device interface 123, and the like) can include physical/virtual computing resources (e.g., a processor and memory) or require access to the array's resources. For example, the memory can be a local memory 145 configured to store code that the processor can execute to perform one or more storage array operations.

In embodiments, the HA 121 can be a Fibre Channel Adapter (FA) that manages communications and data requests between the array 105 and any networked device (e.g., the hosts 114a-n). For example, the HA 121 can direct one or more IOs to one or more of the array's components 101 for further storage processing. In embodiments, the HA 121 can direct an IO request to the array's device interface 123. The device interface 123 can manage the IO request's read/write data operation requiring access to the array's data storage devices 116a-n. For example, the data storage interface 123 can include a device adapter (DA) 130 (e.g., storage device controller), flash drive interface 135, and the like that controls access to the storage devices 116a-n. Likewise, the array's Enginuity Data Services (EDS) processor 110 can manage access to the array's local memory 145. In additional embodiments, the array's EDS 110 can perform one or more self-optimizing techniques (e.g., one or more machine learning techniques) to deliver performance, availability, and data integrity services for the array 105 and its components 101.

In embodiments, the array's storage devices 116a-n can include one or more data storage types, each having distinct performance capabilities. For example, the storage devices 116a-n can include a hard disk drive (HDD), solid-state drive (SSD), and the like. Likewise, the array's local memory 145 can include global memory 150 and memory components 155 (e.g., register memory, shared memory constant memory, user-defined memory, and the like). The array's memory 145 can include primary memory (e.g., memory components 155) and cache memory (e.g., global memory 150). The primary memory and cache memory can be a volatile or nonvolatile memory. Unlike nonvolatile memory, volatile memory requires power to store data. Thus, volatile memory loses its stored data if the array 105 loses power for any reason. In embodiments, the primary memory can include dynamic (RAM) and the like, while cache memory can include static RAM. Like the array's storage devices 116a-n, the array's memory 145 can have different storage performance capabilities.

In embodiments, a service level agreement (SLA) can define at least one Service Level Objective (SLO) the hosts 114a-n expect the array 105 to achieve. For example, the hosts 115a-n can include host-operated applications. The host-operated applications can generate data for the array 105 to store or read its stored data. In addition, the hosts 114a-n can assign different levels of business importance to data types they produce or require. Thus, each SLO can define a service level (SL) for each data type the hosts 114a-n write to or read from the array 105. Further, each SL can specify the host's expected storage performance requirements (e.g., a response time and uptime) for one or more data types.

Accordingly, the array's EDS 110 can establish a storage/memory hierarchy based on one or more of the SLA and the array's storage/memory performance capabilities. For example, the EDS 110 can establish the hierarchy to include one or more tiers (e.g., subsets of the array's storage/memory) with similar performance capabilities (e.g., response times and uptimes). Thus, the EDS-established fast memory/storage tiers can service host-identified critical and valuable data (e.g., Platinum, Diamond, and Gold SLs), while slow memory/storage tiers service host-identified non-critical and less valuable data (e.g., Silver and Bronze SLs).

In embodiments, the HA 121 can present the hosts 114a-n with logical representations of the array's physical storage devices 116a-n and memory 145 rather than exposing their respective physical address spaces. For example, the EDS 110 can establish at least one logical unit number (LUN) representing a slice or portion of a configured set of disks (e.g., storage devices 116a-n). The array 105 can present one or more LUNs to the hosts 114a-n. For example, each LUN can relate to at least one physical address space. Further, the array 105 can mount (e.g., group) one or more LUNs to define at least one logical storage device (e.g., logical volume (LV)).

In further embodiments, the HA 121 can receive an IO request identifying one or more of the array's storage tracks. Accordingly, the HA 121 can parse that information from the IO request to route its related data to its target storage track. In other examples, the array 105 may not have previously associated a storage track to the IO request's related data. The array's DA 130 can assign at least one storage track to service the IO request's associated data in such circumstances. In embodiments, the DA 130 can give each storage track a unique track identifier (TID). Accordingly, each TID can correspond to one or more physical storage address spaces of the array's storage devices 116a-n or global memory 145. The HA 121 can store a searchable data structure that identifies the relationships between the array's LUNs, LVs, TIDs, or physical address spaces. For example, a LUN can correspond to a physical address space, while an LV can correspond to one or more LUNs. Thus, a group of LUNs can relate to an entire storage track (e.g., TID).

Further, the array's RA 140 can manage communications between the array 105 and an external storage system (e.g., remote system 115) via, e.g., a second communication medium 120 using a communications protocol. For example, the first medium 118 or second medium 120 can be an Explicit Congestion Notification (ECN) Enabled Ethernet network.

The array 105 can also include a disk controller 205 that identifies and addresses any undetected disk error, e.g., a latent sector error (LSE) encountered by one or more sectors of the array's storage drives 116a-n as described in greater detail herein. The disk controller 205 can include one or more hardware/circuitry or software/logic elements with architectures designed to perform disk scrubbing operations. In embodiments, one or more of the disk controller's elements can reside in one or more of the array's components 101 (e.g., the HA 121, EDS 110, and DA 130, amongst others).

Figure 2:
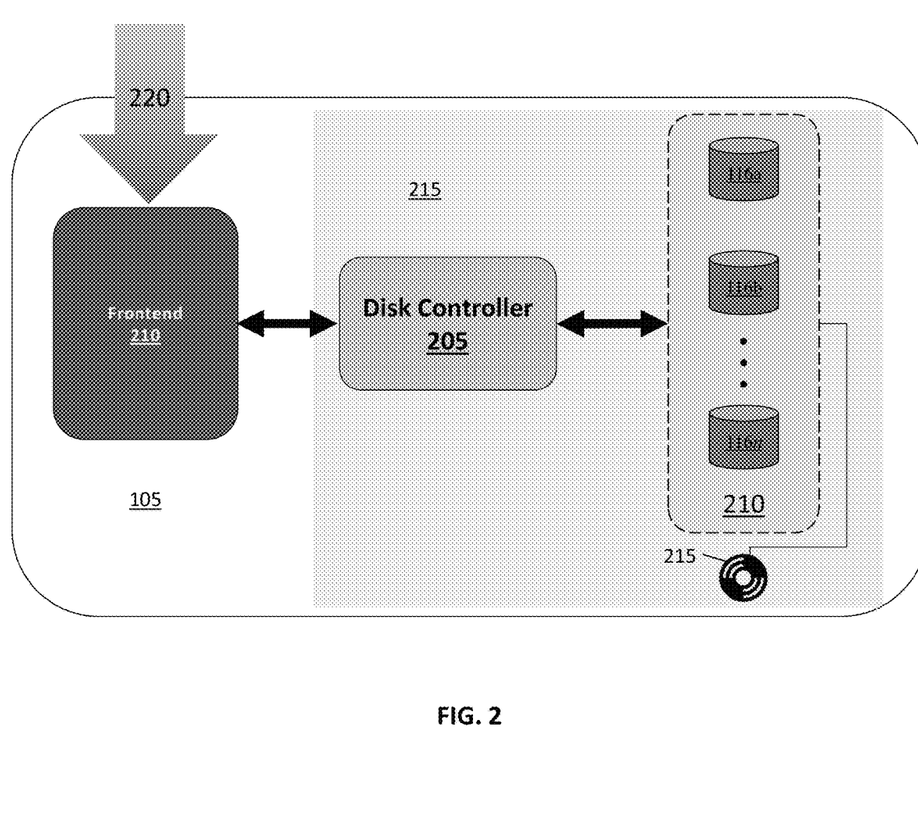
FIG. 2 is a block diagram of a drive controller in accordance with embodiments of the present disclosure.

Regarding FIG. 2, the array 105 can include a logical frontend 210 and backend 215. The logical frontend 210 can comprise the HA 121, EDS 110, and memory 145, amongst one or more of the array's other components 101. In addition, the logical frontend 210 can manage and process the array's received IO workloads 220. For example, the logical frontend 210 can manage storage operations such as IO read/write requests from the IO workload 220. The storage operations can include directing each IO read/write request to global memory 150 or one or more data tracks of the array's storage drives 116a-n.

The array 105 can include a disk controller 205 that performs real-time "drive health" evaluations of the array's drives 116a-n. In embodiments, the array 105 can comprise one or more daemons 215 that are logically or physically connected to one or more of the array's components 101 and drives 116a-n via, e.g., Fibre channels 160. For example, the daemons 215 can record activity information of the components 101 and drives 116a-n in their respective activity log(s). The activity information can include each drive's IO read/write activity, performance characteristics, SL assignments, data track access frequencies, error events, and telemetry data, amongst other storage event-related information.

In embodiments, the disk controller 205 can generate one or more disk activity snapshots by periodically retrieving and analyzing each daemon's activity log. For example, the controller 205 can dynamically establish activity collection schedules based on current, historical, and predicted IO workloads 220. Alternatively, the controller 205 can set a collection period (e.g., IO min snapshot windows) to collect the drive activity logs. In addition, the disk controller 205 can store the snapshots and activity logs in the local memory (e.g., memory 450 of FIG. 4). In other embodiments, the daemons 331 can randomly or periodically issue activity log reports to the resource controller 380. For example, the disk controller 205 can generate a daemon reporting schedule that defines the duration, start times, and end times of each daemon's event collection period. Further, the disk controller 205 can establish reporting schedules based on historical/current IO workload patterns, IO request patterns, and drive activity level patterns.

Current naïve disk scrubbing techniques perform sequential disk scrubbing (i.e., they access disk sectors by increasing logical block address) and use a scrubbing rate that is constant or dependent on a disk's idle time. As such, these current naïve techniques could be scrubbing cold data tracks (i.e., tracks associated with infrequent data access requests) rather than hot data tracks (i.e., tracks associated with frequent data access requests).

In contrast, the embodiments disclosed herein can significantly reduce operational encounters of LSEs (e.g., identifying an LSE in response to directing an IO read/write request to a disk sector) by prioritizing disk drive scrubbing operations. For example, the disk controller 201 can assess the probability of one of the drives 116a-n having an LSE by analyzing the activity snapshots. Based on each drive's likelihood of having an LSE, the disk controller 205 can prioritize and dynamically schedule scrubbing of one or more of each disk's sectors as described in greater detail herein.

Figure 3:
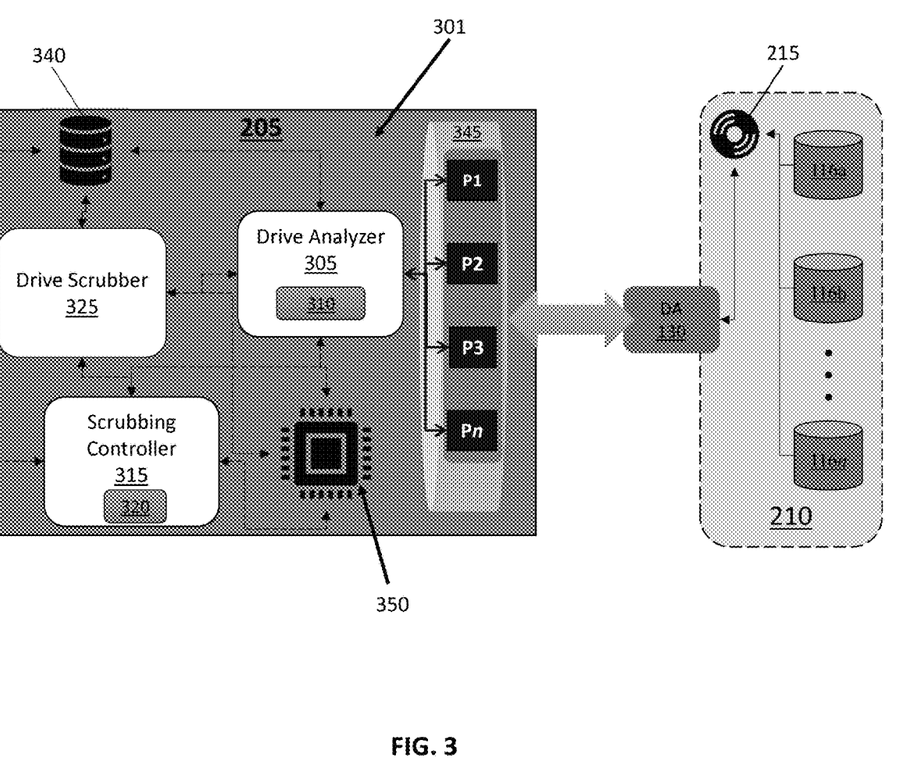
FIG. 3 is a block diagram of a drive scrubbing thread in accordance with embodiments of the present disclosure.

Regarding FIG. 3, the disk controller 205 can include hardware/circuitry and logic/software elements 301 that identify and resolve disk errors. For example, the disk controller 205 can include a drive analyzer 305 that identifies any changes to each drive 116a-n and their respective data tracks via one or more daemons 215. The daemons 215 connect to the array's storage drives 116a-n and maintain activity logs that include a log of activity records for each drive's address spaces, data tracks, or sectors. The analyzer 305 can retrieve each log's recorded activity information and store them in the disk controller's local memory 350. For example, the disk controller 205 can include a drive interface 345 that can logically or physically connect the disk controller 205 to the drives 116a-n.

In embodiments, the drive interface 345 can establish a direct connection between the controller 205 and drives 116a-n. In other embodiments, the interface 345 can form an indirect or logical connection with the drives 116a-n via the array's DA 130. In addition, the drive interface 345 can establish one or more logical ports P1-Pn configured to receive disk activity information from the daemons 215. For example, the drive interface can logically associate each port P1-Pn with one or more of the drives 116a-n. Further, the drive interface 345 can store the received activity logs in a database 340 collection or table by each disk drive, storage group, or other logical storage groupings (e.g., disk drive, disk sector, data track, or address space groupings). For instance, each drive interface 345 can map each port P1-Pn to a disk drive using each drive's device (e.g., drive) identifier (ID). Further, the drive interface 345 can generate and associate a unique drive hash from each drive ID with one of its ports, P1-Pn. As such, the drive interface 345 can direct activity logs to the database's appropriate table or collection based on the port P1-Pn it receives the activity log.

Accordingly, the drive analyzer 305 can analyze the activity logs by issuing logical queries to the database 340. For instance, the drive analyzer 305 can perform database queries using a machine learning (ML) engine 310. The ML engine 310 can analyze activity records collected during a most recent snapshot collection window to calculate each drive's related local outlier factor (LOF). For example, the ML engine 310 can include login and circuitry with a self-learning neural network architecture designed to calculate drive LOF. Regarding FIG. 3A, for example, the ML engine 310 can generate a graph (e.g., graph 300) that compares each drive's activity level 309 and corresponding activity density 307 with respect to their neighboring drive's activity level 309 and related activity density 307 during one or more snapshot collection windows 303. For instance, each of the graph's scatter plot represents one of the array's drives 116a-n. For example, the ML engine 310 can analyze the activity logs on a drive sector level, drive data track level, or drive address space level during the snapshot collection windows 303.

Figure 3A:
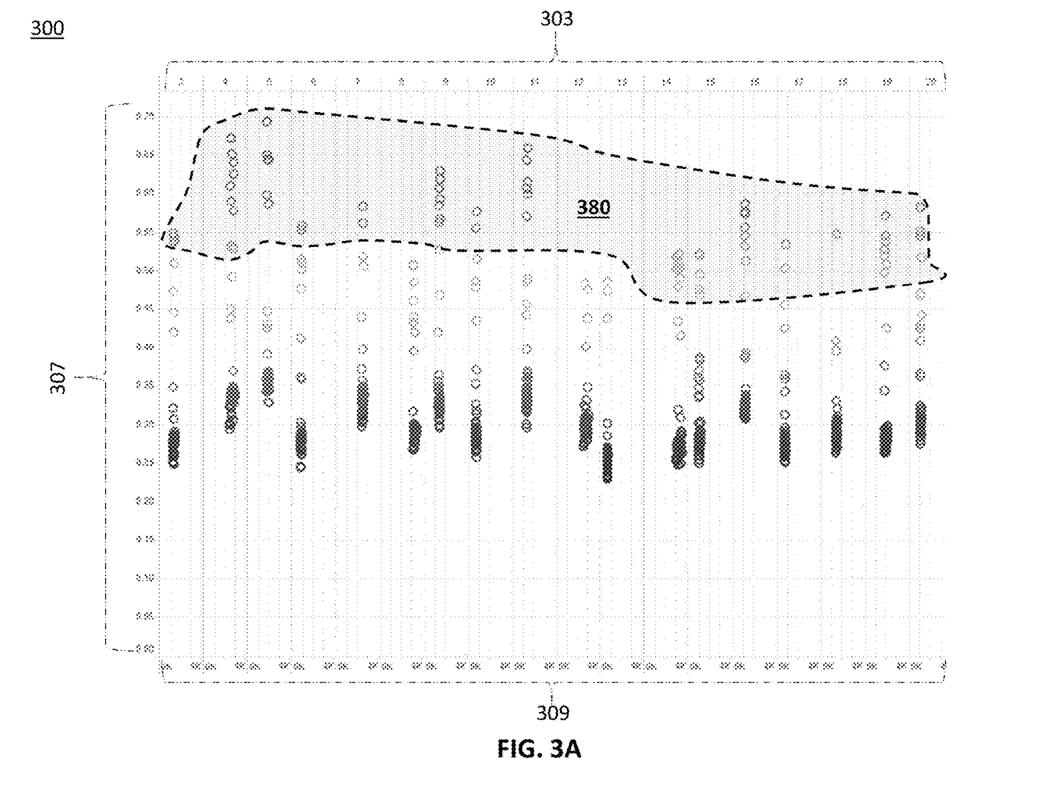
FIG. 3A is a graph of drive activity levels and their corresponding activity densities in accordance with embodiments of the present disclosure.

In embodiments, the disk controller 205 can include a scrubbing controller 315 that can identify abnormal disk activity 380 by performing local deviation analysis on the graph's scatter plots (e.g., each drive). For example, the scrubbing controller 315 identifies unexpected activity patterns (i.e., those disk activity patterns that do not conform with expected activity patterns) using an ML engine 320. For instance, the ML engine 320 can determine each drive's activity density coefficient relative to their neighboring drives' activity density coefficient to assess each drive's degree of unexpected activity density. Using each drive's determined degree of unexpected activity, the scrubbing controller 315 can assign each drive with an outlier score. Further, the scrubbing controller 315 can generate a scrubbing schedule that prioritizes drives based on their respective outlier scores. The scrubbing controller 315 can store the scrubbing schedule in local memory 350

In embodiments, the disk controller 205 can include a drive scrubber 325 that scrubs the array's drives 116a-n. For example, the drive scrubber 325 can scrub drives in a sequence defined by the scrubbing schedule stored in the disk controller's local memory 350. Advantageously, the drive controller 205 can dynamically update and adjust a drive scrubbing sequence based on real-time changes in each drive's outlier scores. Specifically, the scrubbing controller 315 can update the scrubbing scheduled stored in the local memory 350 by changing each drive's priority ranking in the schedule according to real-time changes in the respective outlier scores.

The following text includes details of one or more methods or flow diagrams in accordance with this disclosure. For simplicity of explanation, the methods are depicted and described as a series of acts. However, acts in accordance with this disclosure can occur in various orders or concurrently and with other acts not presented and described herein. Furthermore, not all illustrated acts may be required to implement the methods described herein.

Figure 4:
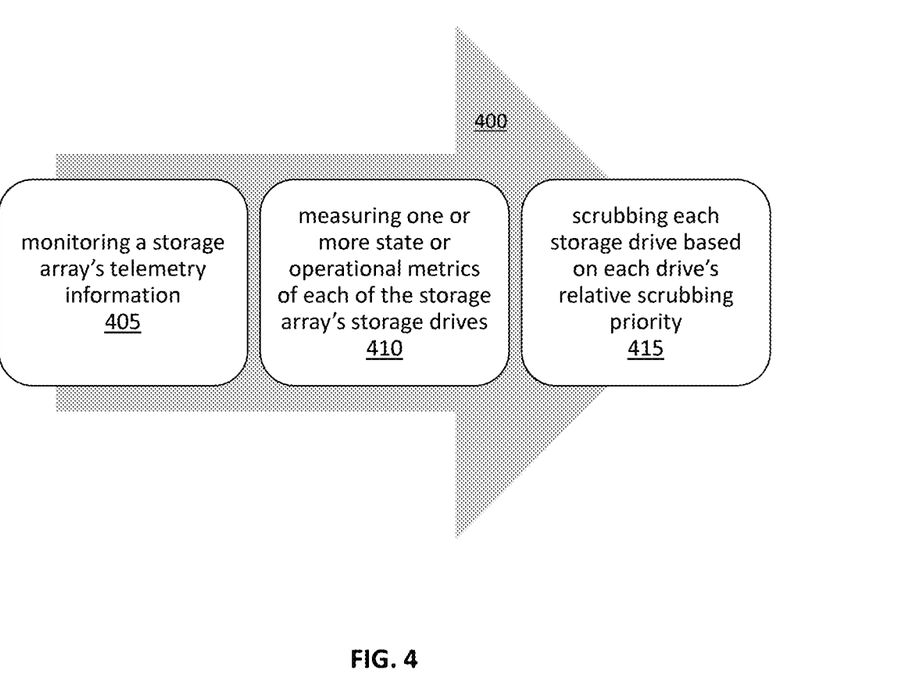
FIG. 4 is a flow diagram of a method for detecting and correcting a storage array's drive sectors to prevent data loss in accordance with embodiments of the present disclosure.

Regarding FIG. 4, a method 400 can be executed by any of the array's other components (e.g., components 101 of FIG. 1). The method 400 describes a technique for detecting and correcting a storage array's drive sectors to prevent data loss. At 405, the method 400 can include monitoring a storage array's telemetry information. The method 400, at 410, can also include measuring one or more state or operational metrics of each of the storage array's storage drives. At 415, the method 400 can further include scrubbing each storage drive based on each drive's relative scrubbing priority. The scrubbing priority can be based on each drive's telemetry information, drive state, or operation metrics. It should be noted that each step of the method 400 can include any combination of techniques implemented by the embodiments described herein.

Using the teachings disclosed herein, a skilled artisan can implement the above-described systems and methods in digital electronic circuitry, computer hardware, firmware, or software. The implementation can be as a computer program product. The implementation can, for example, be in a machine-readable storage device for execution by or to control the operation of, data processing apparatus. The implementation can, for example, be a programmable processor, a computer, or multiple computers.

A computer program can be in any programming language, including compiled or interpreted languages. The computer program can have any deployed form, including a stand-alone program or subroutine, element, or other units suitable for a computing environment. One or more computers can execute a deployed computer program.

One or more programmable processors can perform the method steps by executing a computer program to perform functions of the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implement that functionality.

Processors suitable for executing a computer program include, by way of example, both general and special purpose microprocessors and any one or more processors of any digital computer. Generally, a processor receives instructions and data from a read-only memory, a random-access memory, or both. Thus, a computer's essential elements can include a processor that executes instructions that the computer's one or more memory devices store. Generally, a computer can include, can be operatively coupled to receive data from or transfer data to one or more mass storage devices for storing data (e.g., magnetic, magneto-optical disks, or optical disks).

Data transmission and instructions can also occur over a communications network. Information carriers suitable for embodying computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated in special purpose logic circuitry.

A computer having a display device that enables user interaction can implement the above-described techniques. The display device can, for example, be a cathode ray tube (CRT) or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system that includes a backend component can also implement the above-described techniques. The backend component can, for example, be a data server, a middleware component, or an application server. Further, a distributing computing system that includes a frontend component can implement the above-described techniques. The frontend component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication networks include a local area network (LAN), a wide area network (WAN), the Internet, wired networks, or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), or other packet-based networks. Circuit-based networks can include, for example, a public switched telephone network (PSTN), a private branch exchange (PBX), a wireless network, or other circuit-based networks. Finally, wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

The terms "comprise," "include," and "or" are open-ended, include the listed parts, and contain additional elements that are not listed. Additionally, the term "or" is open-ended and includes one or more of the listed parts and combinations of the listed features.

One skilled in the art will realize that other specific forms can embody the concepts described herein without departing from their spirit or essential characteristics. Therefore, the preceding embodiments are, in all respects, illustrative rather than limiting the concepts described herein. The appended claims thus recite the scope of this disclosure. Therefore, all changes embrace the meaning and range of equivalency of the claims.

What is claimed is:

1. A method comprising:
monitoring a storage array's telemetry information;
measuring one or more state or operational metrics corresponding to each sector of each of the storage array's storage drives;
determining a degree of unexpected activity density for each sector of each storage drive using the telemetry information and each drive's state or operation metrics, wherein the degree of unexpected activity density relates to a local outlier factor (LOF) corresponding to a snapshot collection window of each storage drive;
comparing each storage drive's activity level and corresponding activity density with respect to their neighboring storage drives' activity levels and related activity densities;
scrubbing each storage drive based on each sector's degree of unexpected activity density; and
controlling an allocation of the storage array's computing resources to disk scrubbing operations based on input/output (IO) operations per second (IOPS) of each IO workload the storage array receives.

2. The method of claim 1, further comprising:
monitoring one or more input/output (IO) workloads received by the storage array;
identifying one or more characteristics of each workload's IO operations; and
reading prior written data from each storage drive's storage media to detect any errors during a read operation.

3. The method of claim 2, wherein the one or more characteristics include at least one or more of an IO size, IO type, IO service level, destination target device, data types related to each IO operation, address spaces, IO densities, and response time requirements.

4. The method of claim 1, wherein the state or operational metrics correspond to one or more of each storage drive's capacity, performance capabilities, idle or operating temperatures, powered on/off conditions, errors, and IO characteristics of IO operations associated with each storage drive, amongst other storage drive metrics.

5. The method of claim 4, further comprising:
determining each storage drive's performance by analyzing their respective state, operational metrics, received IO sizes, amount and frequency of received IO data read/write requests, and response times, amongst other related performance parameters.

6. The method of claim 1, further comprising establishing one or more data collection time intervals to collect and analyze the telemetry, state, and operational information/metrics.

7. The method of claim 6, wherein each data collection time interval is based on patterns identified from historical or current IO workloads received by the storage array.

8. The method of claim 6, further comprising determining each storage drive's relative scrubbing priority within each data collection time interval.

9. The method of claim 8, further comprising determining each drive's relative scrubbing priority from each storage drive's respective local outlier factor (LOF), wherein each storage drive's LOF is defined by the drive's relative state or operational metrics.

10. The method of claim 9, further comprising:
aggregating each drive's state or operational metrics;
generating one or more outlier models from the aggregated state or operational metrics using one or more machine learning (ML) techniques; and
assigning each storage drive with a drive's relative scrubbing priority using the one or more outlier models.

11. An apparatus comprising a processor and memory configured to:
monitor a storage array's telemetry information;
measure one or more state or operational metrics corresponding to each sector of each of the storage array's storage drives;
determine a degree of unexpected activity density for each sector of each storage drive using the telemetry information and each drive's state or operation metrics, wherein the degree of unexpected activity density relates to a local outlier factor (LOF) corresponding to a snapshot collection window of each storage drive;
compare each storage drive's activity level and corresponding activity density with respect to their neighboring storage drives' activity levels and related activity densities;

scrub each storage drive based on each sector's degree of unexpected activity density; and control an allocation of the storage array's computing resources to disk scrubbing operations based on input/output (IO) operations per second (IOPS) of each IO workload the storage array receives.

12. The apparatus of claim 11, further configured to:

monitor one or more input/output (IO) workloads received by the storage array;

identify one or more characteristics of each workload's IO operations; and read prior written data from each storage drive's storage media to detect any errors during a read operation.

13. The apparatus of claim 12, wherein the one or more characteristics include at least one or more of an IO size, IO type, IO service level, destination target device, data types related to each IO operation, address spaces, IO densities, and response time requirements.

14. The apparatus of claim 11, wherein the state or operational metrics correspond to one or more of each storage drive's capacity, performance capabilities, idle or operating temperatures, powered on/off conditions, errors, and IO characteristics of IO operations associated with each storage drive, amongst other storage drive metrics.

15. The apparatus of claim 14, further configured to:

analyze each storage drive's respective state, operational metrics, received IO sizes, amount and frequency of received IO data read/write requests, and response times, amongst other related performance parameters to determine their respective drive performances.

16. The apparatus of claim 11, further configured to establish one or more data collection time intervals to collect and analyze the telemetry, state, and operational information/metrics.

17. The apparatus of claim 16, wherein each data collection time interval is based on patterns identified from historical or current IO workloads received by the storage array.

18. The apparatus of claim 16, further configured to determine each storage drive's relative scrubbing priority within each data collection time interval.

19. The apparatus of claim 18, further configured to determine each drive's relative scrubbing priority from each storage drive's respective local outlier factor (LOF), wherein each storage drive's LOF is defined by each drive's relative state or operational metrics.

20. The apparatus of claim 19, further configured to:

aggregate each drive's state or operational metrics;

generate one or more outlier models from the aggregated state or operational metrics using one or more machine learning (ML) techniques; and assign each storage drive with a drive's relative scrubbing priority using the one or more outlier models.

* * * * *